No. 772,813. PATENTED OCT. 18, 1904.
T. MIDGLEY.
METALLIC VEHICLE WHEEL.
APPLICATION FILED AUG. 21, 1903. RENEWED APR. 13, 1904.
NO MODEL.
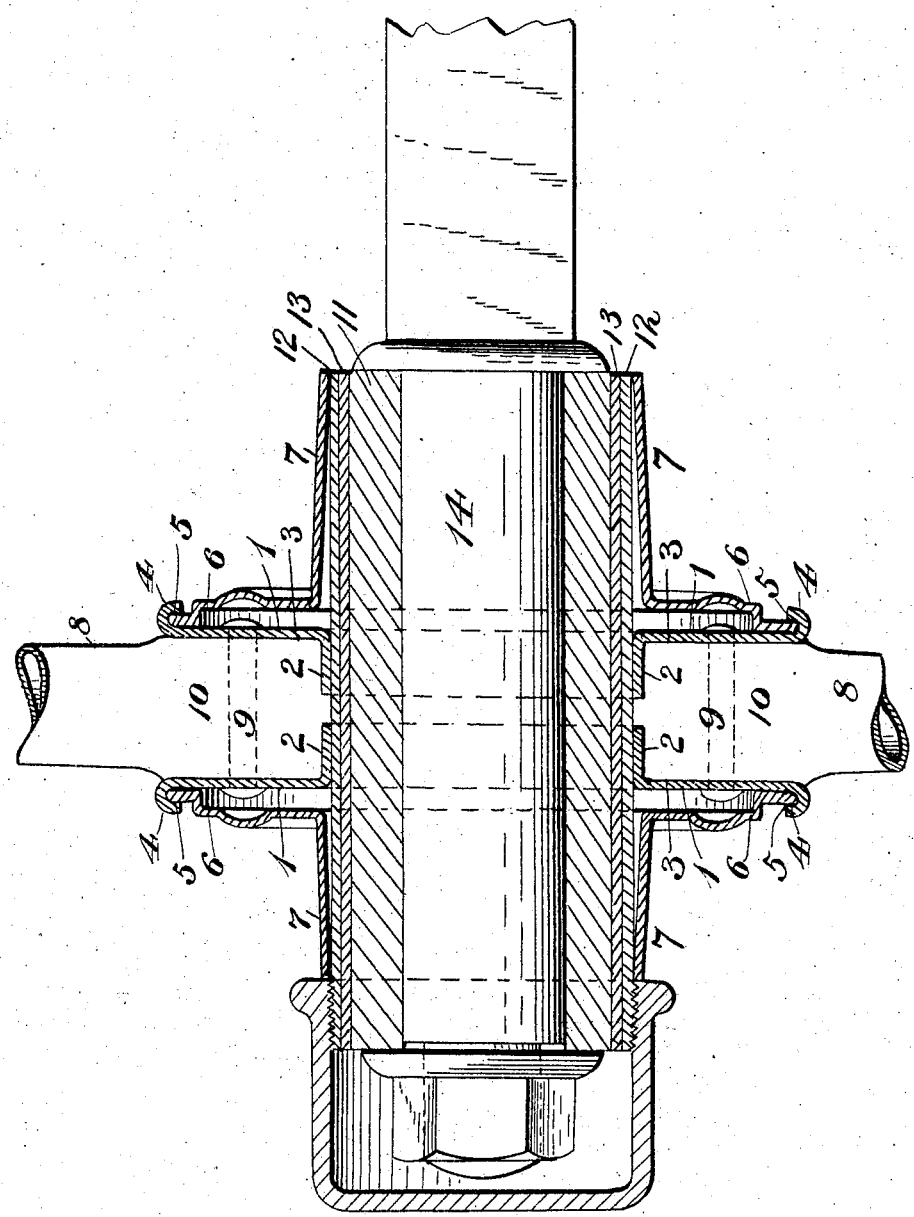
Witnesses: Inventor
F. L. Ormand. Thomas Midgley.
W. Parker Reinohl. By his Attorney D. L. Reinohl.

No. 772,813. Patented October 18, 1904.

UNITED STATES PATENT OFFICE.

THOMAS MIDGLEY, OF COLUMBUS, OHIO, ASSIGNOR TO THE MIDGLEY MANUFACTURING COMPANY, OF COLUMBUS, OHIO, A CORPORATION OF OHIO.

METALLIC VEHICLE-WHEEL.

SPECIFICATION forming part of Letters Patent No. 772,813, dated October 18, 1904.

Application filed August 21, 1903. Renewed April 13, 1904. Serial No. 203,035. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Vehicle-Wheels; and I do hereby declare the following to be a full, clear, and exact description of the invention, such as will enable others skilled in the art to which it appertains to make and use the same.

My invention relates primarily to metallic vehicle-wheels, has especial reference to the hub of such wheels, and has for its object economy in the manufacture and durability of the wheels; and the invention consists in certain improvements in construction, which will be fully disclosed in the following specification and claims.

The accompanying drawing, which forms part of this specification, represents a vertical transverse section of a hub, showing the spokes of the wheel and the axle in side elevation.

Reference being had to the drawing and the designating characters thereon, 1 indicates right and left hub-forming disks, each having an annular inwardly-bent right-angled flange 2, which form the inner concentric wall or bottom of the spoke-chamber 3 of the hub, and on the outer boundary or periphery of said disks are outwardly-bent flanges 4, which are bent over and engage the outer edge or periphery 5 of the hub-sections 6, whose cylindrical body 7 extends in opposite directions from the disks 1.

Within the spoke-chamber 3 are spokes 8, which are secured to the disks 1 by bolts 9, which extend through the head 10 of the spoke and through both of said disks and are concealed by the hub-sections 6.

11 indicates the axle-box, in this instance made of two concentric tubular sections 12 13, which are surrounded by the disks 1 and the hub-section 6, and within the axle-box is shown an axle 14.

The disks, the hub-sections, the spokes, and the tubular sections shown, and the rim of the wheel (not shown) being assembled, the wheel is dipped or immersed in a bath of molten brazing metal and all the parts metallically joined together, when the wheel presents the appearance of a solid and compact structure.

Having thus fully described my invention, what I claim is—

1. A metallic wheel-hub composed of opposite disks having inner right-angled flanges forming the spoke-chamber, and outer flanges, and opposite hub-sections engaged by said outer flanges, and an axle-box within said disks and hub-sections, the said parts being metallically joined together.

2. A metallic wheel-hub composed of opposite disks having inner right-angled flanges forming the spoke-chamber, and outer flanges bent in the opposite direction, and hub-sections engaged by said outer flanges, and concentric axle-box sections within said disks and hub-sections, the said parts being metallically joined together.

In testimony whereof I affix my signature in presence of two witnesses.

THOMAS MIDGLEY.

Witnesses:
FRED MIDGLEY,
FRED W. FLOWERS.